PHASE MODULATION READ OUT CIRCUIT

Filed Jan. 15, 1962 3 Sheets-Sheet 1

INVENTORS
THEODORE H. BONN
JACK S. CUBERT
JAMES A. FRAUNFELDER

BY Edward M. Farrell
ATTORNEY

PHASE MODULATION READ OUT CIRCUIT

Filed Jan. 15, 1962 3 Sheets-Sheet 2

Sept. 28, 1965 J. A. FRAUNFELDER ETAL 3,209,268

PHASE MODULATION READ OUT CIRCUIT

Filed Jan. 15, 1962 3 Sheets-Sheet 3

United States Patent Office 3,209,268
Patented Sept. 28, 1965

3,209,268
PHASE MODULATION READ OUT CIRCUIT
James A. Fraunfelder, North Wales, Jack S. Cubert, Willow Grove, and Theodore H. Bonn, Merion Station, Pa., assignors to Sperry Rand Corporation, New York, N.Y., a corporation of Delaware
Filed Jan. 15, 1962, Ser. No. 166,305
6 Claims. (Cl. 328—165)

This invention relates to a reading circuit in a computer system, and more particularly to a circuit for reading information signals and eliminating spurious pulse signals from a train of signals.

In so called phase modulation systems which may be used in computers, binary information signals are recorded on a recording medium, such as a magnetic drum or tape. Such binary signals, having one of two different characteristics, may represent a "1" or a "0." A signal representing a "1," for example, may be represented by an alternating signal having a first form during the first half of its digit period and a second form during the second half of its digit period. Likewise, a "0" may be represented by a signal which is in the second form during the first half of its digit period and in the first form during the second half of its digit period. Both types of signals may be considered as passing through zero in going from one level to another at the middle of their digit periods.

After the recorded signals are read from the recording medium, they are generally passed through various electrical circuits and are converted to a form of square wave or rectangular shaped signals. These square wave signals are then used to produce information pulse signals at the middle of the digit periods representing either a "1" or a "0." In generating the information pulse signals, so called spurious or non-significant pulse signals are produced whenever two consecutive information signals of a similar nature are read from the recording medium. Various additional means must generally be employed to eliminate these spurious signals before passing on the information signals to subsequent utilization circuits.

It is an object of this invention to provide an improved circuit for eliminating spurious pulse signals from a wave train of information pulses in a phase modulation reading circuit of a computer system.

In accordance with the present invention, square wave signals representing information read out from a recording medium square wave signals are applied to an integrator circuit. The same signals are also used to generate information pulse signals with undesired spurious pulse signals being generated in the process. The rate of charge and discharge of the integrator circuit is maintained relatively constant. If the nature of two consecutive square wave signals representing information are the same, the integrator circuit assumes either a positive or a negative charge. If the two consecutive signals are different, the integrator circuit assumes substantially zero charge. Means for detecting the state of charge at the integrator circuit at the end of each digit period are provided. Various gating circuits may be actuated in accordance with the state of charge of the integrator circuit to permit information pulses to be applied to an output circuit while inhibiting the passage of spurious or non-significant pulses.

Other objects and advantages of the present invention will be apparent and suggest themselves to those skilled in the art, from a reading of the following specification and claims in which:

Figures 1, 3:
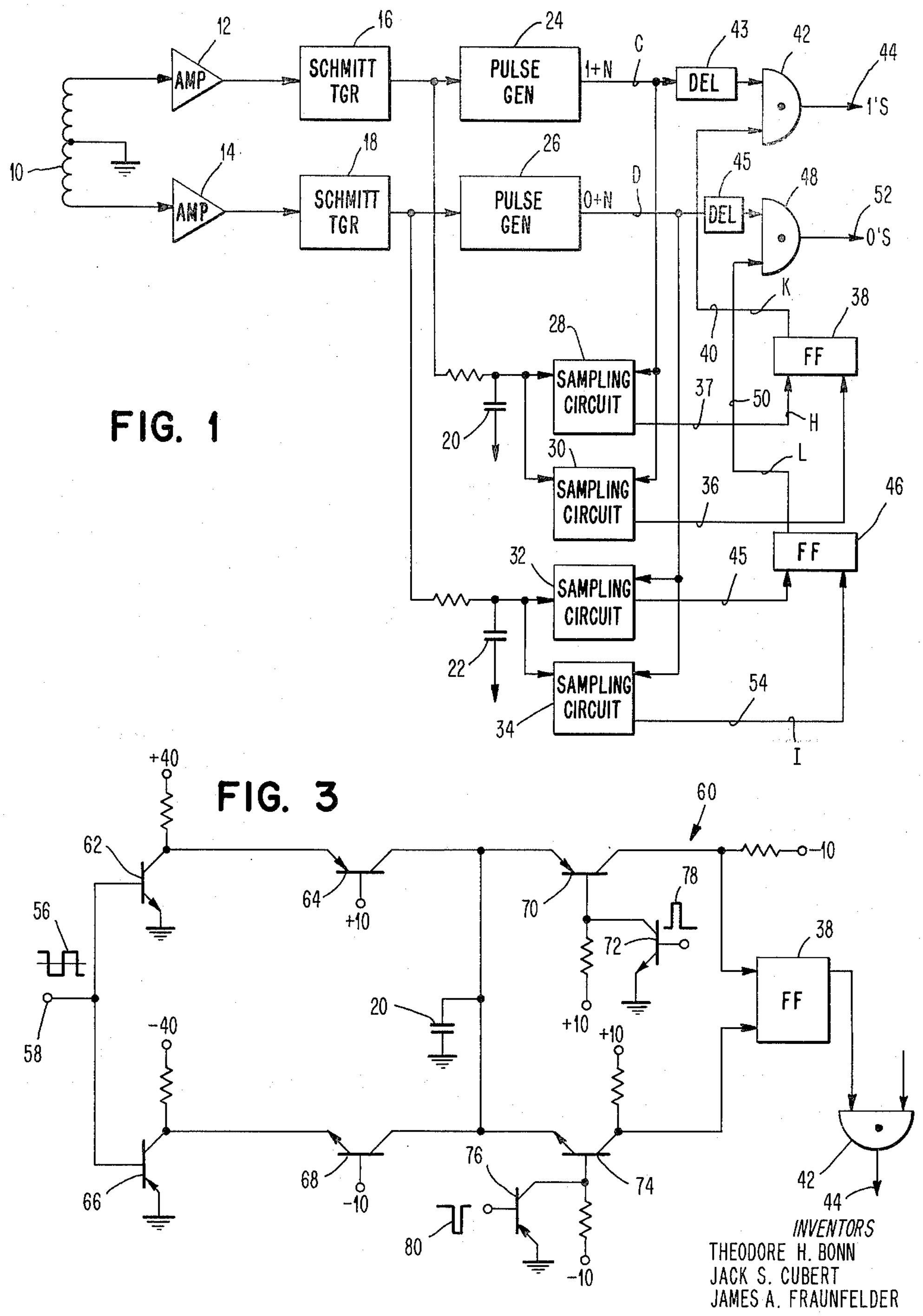
FIGURE 1 is a block diagram illustrating a reading circuit in a phase modulation system, in which the present invention may be employed.
FIGURE 3 is a schematic diagram of one type of a detection circuit, which may be utilized in connection with the present invention.
Figure 2:
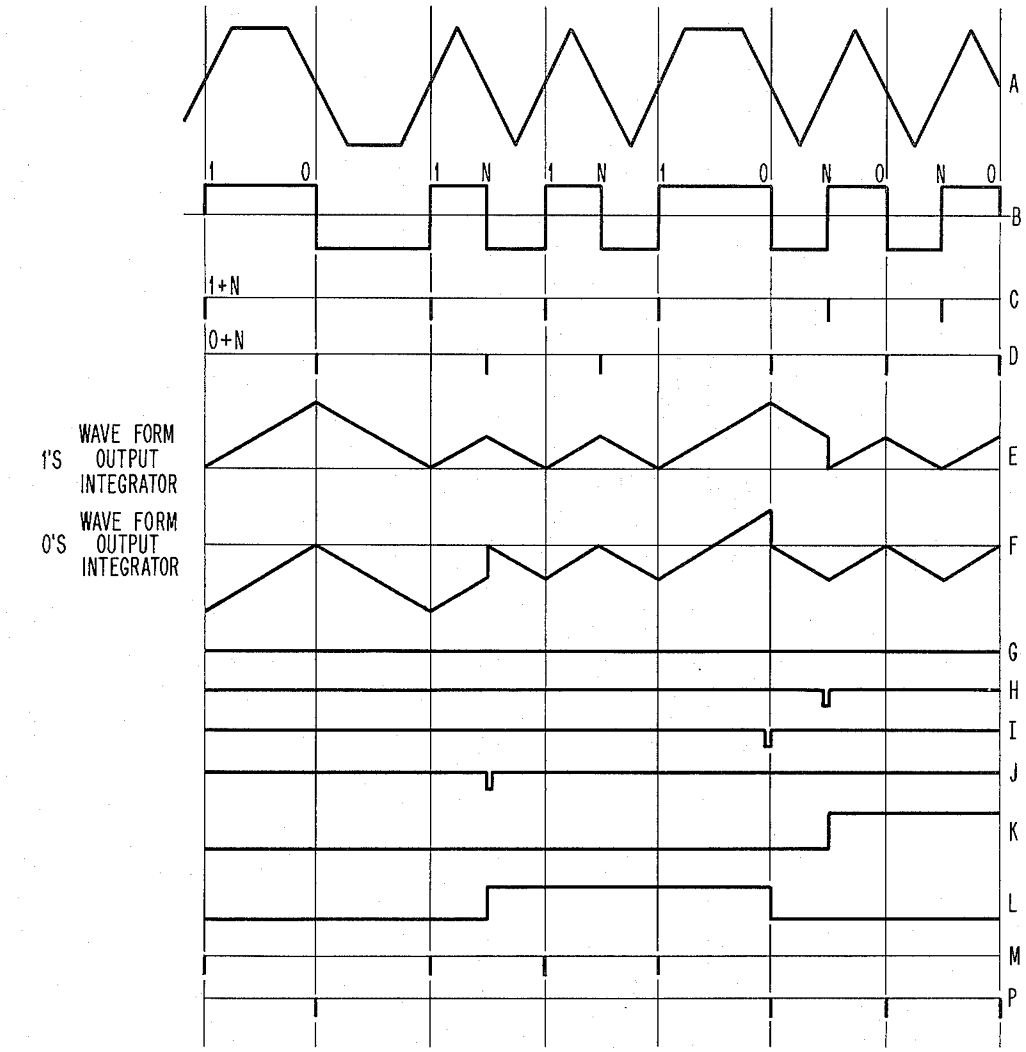
FIGURE 2 illustrates a series of waveforms shown for the purpose of describing the operation of the phase modulation system of FIGURE 1.

Referring to FIGURES 1 and 2, a reading arrangement for a phase modulation reading system, which involves the present invention, is illustrated. A coil 10 may be associated with a reading head for a tape or drum storage device, for example. During a reading operation, electrical signals are induced in the coil 10 and applied to a pair of amplifiers 12 and 14. These signals may be considered as roughly corresponding to the signals represented by the waveform A of FIGURE 2. The output signals from the amplifiers 12 and 14 are applied to a pair of Schmitt trigger circuits 16 and 18, respectively. Such Schmitt trigger circuits are responsive to the zero cross over points of the input signals to produce square wave signals at the output circuits. The output signal from the Schmitt trigger circuits are illustrated by a waveform B.

The output signals from the Schmitt trigger circuits 16 and 18 are applied to a pair of capacitors 20 and 22, respectively. The output signals from the Schmitt trigger circuits 16 and 18 are also applied to a pair of pulse generator circuits 24 and 26, respectively, to produce a series of pulse signals. The output pulse signals from the pulse generators 24 and 26 are represented by wave forms C and D, respectively.

The output electrical signals from the Schmitt trigger circuits 16 and 18 cause a charging and discharging of the capacitors 20 and 22, respectively. One such circuit for accomplishing this function will be described in connection with FIGURE 3. The output pulse signals from the pulse generator 24 are applied to sampling circuits 28 and 30. Likewise, the output pulse signals from the pulse generator 26 are applied to sampling circuits 32 and 34.

When the signals represented by the waveform B is applied from the Schmitt trigger circuit 16, the capacitor 20 charges and discharges at a rate illustrated by the waveform E. Likewise, the output signal from the Schmitt trigger circuit 18 causes the capacitor 22 to charge and discharge at a rate illustrated by the waveform F.

The output pulse signals from the pulse generator 24 are applied to the sampling circuits 28 and 30 in order to detect the state of charge of the capacitor 20. If the state of charge of capacitor 20 is zero, no output signal will be developed on either line 36 or 37 and the operating state of a flip flop circuit 38 will not be affected. On the other hand, if the state of charge of the capacitor 20 is other than zero, a pulse signal will be developed at one of the lines 36 or 37, and applied to switch the operating state of the flip flop circuit 38.

If a pulse signal is produced by the pulse generator 24 and applied to the sampling circuits 28 and 30 when the voltage charge at the capacitor 20 is positive with respect to some fixed point of reference potential, such as ground, a pulse signal, illustrated by the waveform H, will be produced and applied to the flip flop circuit 38. The output signal at line 40 of flip flop circuit 38, represented by a waveform K, is then applied to a gate circuit 42. When the output voltage from the flip flop circuit 38 is at a high, or more positive level with respect to a point of reference potential, the gate circuit 42 opens to permit pulses from the pulse generator circuit 24 to pass therethrough to an output terminal 44. When the output voltage from the flip flop circuit 38 drops, or is at less positive level, the gate circuit 42 is closed thereby inhibiting the passage of pulses from the pulse generator 24 to the output terminal 44.

Each time that the capacitor 20 is charged to either a positive or negative voltage level with respect to ground, it is discharged to zero volts during the time interval of the sampling signals. Pulses are developed to switch the operating states of flip flop circuits 38 or 46 if one of the capacitors 20 or 22 have assumed a charge and are caused to be discharged by the application of sampling pulses.

A second gating circuit 48, similar to the gating circuit 42, is controlled by the operating state of the flip flop 46. The operating state of the flip flop 46, having an output waveform such as illustrated at point L, is produced at line 50 to control the gating circuit 48.

Output pulse signals from the pulse generator 26, illustrated by the waveform D, are applied to a pair of sampling circuits 32 and 34 to detect the state of charge at the capacitor 22. If the state of charge at the capacitor 22, illustrated by the waveform F is negative, a negative pulse, represented by the waveform J, is applied from the output line 45 of the sampling circuit 32 to the flip flop 46. When the capacitor 22 has a charge during the sampling pulse, the operating state of the flip flop 46 is switched to close the gate circuit 48. This prevents any pulses from the pulse generator 26 from passing through the gate circuit 48 to an output terminal 52. Delay circuits 43 and 45 may be provided, if necessary, to delay the information signals so that the proper gating signals have had time to be applied to gating circuits 42 and 48.

It is noted that in the signal train, illustrated by the waveform C include pulses which represent true "1" information, as well as pulses which do not represent the information. The latter type pulses may be classified as spurious or non-significant pulses. The signal train waveform M, representing the pulse signals passing through the gate 42 to the output terminal 44, on the other hand, include only pulses representing true "1" bits of information and do not include non-significant or spurious pulses. The reason for this is that the gate 42 is open only during the time that pulses are developed by the pulse generator 24 and is closed during the time interval involving the non-significant pulses.

Likewise, it is seen that the output pulses from the pulse generator 26, illustrated by the waveform D, include information pulses representing "0" information as well as non-significant pulses. The waveforms N, however, includes only true "0" information pulses. The reason for this is that the gate circuit 48 is open during the information period and closed for the non-significant pulse periods.

In FIGURE 3, there is illustrated one form of circuit which may be employed for detecting the state of charge of a capacitor to control the operation of a flip flop circuit, which in turn controls the operation of a gating circuit. For purposes of clarification, only the portion of the circuit relation to the "1" information plus non-significant pulses are illustrated. The portion of the circuit relating to the "0" information signals is not illustrated, since it is substantially identical to the "1" portion of the circuit. Also, the circuit details relating to the pulse generator, flip flop and AND gate circuits are not illustrated for purposes of clarity. Such circuits are conventional and well known to those skilled in the computer art. The particular details of these circuits are not specifically directed to features of the present invention.

Referring now to FIGURE 3, a rectangular signal illustrated by a waveform 56, is applied to an input terminal 58 of a detection circuit 60. A first pair of transistors 62 and 64 and a second pair of transistors 66 and 68 provide means coupling the input signal 56 to an integrator circuit, illustrated as the capacitor 20. The transistors 62 and 68 are illustrated as being of the NPN types, while the transistors 64 and 66 are of the PNP types. As will be described, the capacitor 20 will assume a negative or positive potential charge, with respect to ground, whenever one portion of the input signal 56 is not symmetrical with the immediately subsequent portion of the cycle, i.e., the two successive portions of signal are not of the same duration or width. For purposes of explanation, the upper portion of the signal represented by the waveform 56 will be considered positive with respect to ground, and the lower portion of the signal will be considered negative. If the input signal includes two consecutive symmetrical portions of equal width, the capacitor 20 will assume a zero charge at the end of the two portions of signal.

A pair of transistors 70 and 72 and a pair of transistors 74 and 76 are provided for detecting the state of charge of the capacitor 20. The transistors 70 and 76 are of the PNP types while the transistors 72 and 74 are of the NPN types. Dependent upon the state of charge of the capacitor 20, i.e. whether it assumes a negative or positive charge, an output signal will be developed at the collector electrode of one of the transistors 70 or 74. A signal developed at the collector of either transistor 70 or 74 will be applied to actuate a utilization circuit, such as the flip flop circuit 38.

In considering the operation of the circuit illustrated, assume that the transistors 62, 64, 66 and 68 are biased through the application of suitable operating voltages to produce certain operating conditions. The transistor 62 is biased to a normally "off" or non-conducting state. The transistor 64 is biased to an "on" or conducting state. During the time that the transistor 64 is conducting, a relatively constant current charges the capacitor 20. When the input signal 56 is negative, the transistor 66 is biased to a normally "on" or saturated state, while the transistor 68 is biased to a normally "off" or non-conducting state.

When the input signal 56 switches to a positive state from a negative state, the transistors 62, 64, 66 and 68 are all switched to their opposite operating states. The transistors 62 and 68 are switched from their "off" states to their "on" states and the transistors 64 and 66 are switched from their "on" states to their "off" states. Under these operating conditions, a constant current linearly discharges the capacitor 20. If the signal cycle of the signal, i.e. two consecutive portions of opposite polarities, is symmetrical or of the same durations or widths, the voltage at the end of the charging and discharge periods of the capacitor 20 at the end of the two consecutive periods will be zero. On the other hand, if the signal 56 does not include two consecutive periods of the same duration, i.e. they are not symmetrical, the capacitor 20 will assume a positive or negative charge, depending on which of the two periods is longer in duration.

When the time intervals of two consecutive signal periods are the same, the capacitor 20 will charge during the first period and discharge during the second period. Since the time intervals of the two periods are the same, the total charge at the capacitor 20 will be the same at the end of the two periods as it was at the start of the two periods. This charge will generally be zero voltage.

When the two consecutive time periods are different to cause either a positive or negative charge at the capacitor 20, the polarity of the charge retained by the capacitor 20 will depend upon which of the two periods is longer in duration. If the longer period of the signal is positive, the capacitor 20 will assume a positive charge. If the longer period is negative the capacitor 20 will assume a negative charge. The capacitor 20 is discharged to zero during the sampling intervals whenever a voltage charge is present. The discharge will take place through transistors 70 and 72 or through transistors 74 and 76 dependent upon which pair of transistors is conducting. Output pulse signals are applied to the flip flop circuit 38 during the discharge of the capacitor 20. These output pulses will set or reset the flip flop 38, dependent upon the nature of the charge at the capacitor 20.

The pulse signal at the collector of the transistor 70 may be applied to set the flip flop 38. The flip flop 38, in turn, may control the operation of an AND gate circuit 44. The transistors 70 and 74 may be considered as a form of AND gate circuits which produce output signals when two input signals, i.e. a voltage signal from the capacitor 20 and a sampling pulse, are simultaneously applied thereto. One input signal alone is not sufficient to produce an output signal at the collector of the transistor 70, since the applied voltages will not be sufficient to switch the transistor from a non-conducting to a conducting state.

If the voltage charge at the capacitor 20 is negative in polarity at the time of the sampling pulses 78 and 80, a pulse signal is produced at the collector of the transistor 74 as the capacitor 20 discharges through the transistor 74. This pulse signal is applied to the flip flop 38 to switch or reset the flip flop. The gate circuit 44, being connected to the set output of the flip flop 44, will be opened or closed depending upon the operating state of the flip flop 38, which in turn is dependent upon the last state of charge of the capacitor 20 during a sampling interval.

Thus the transistors 70 and 74 may be considered as the sampling circuits 28 and 30 of FIGURE 1. The transistors 62, 64, 66 and 68 may provide the source of output signal such as from the Schmitt trigger circuit 16 of FIGURE 1.

In practicing the present invention, when an integration circuit is employed to eliminate non-significant or spurious pulse signals, other arrangements than that illustrated in FIGURE 1 may be employed. In FIGURE 1, for example, the presence of a charge at an integration circuit was utilized to denote the presence of a non-significant zero crossover point in a train of electrical signals. A zero charge at the integration circuit was utilized to denote the presence of information at the zero crossover point. In practicing the present invention, it is possible to utilize the presence of a charge at an integration circuit to denote the presence of information signals and a zero charge to denote non-significant signals. Such an arrangement is illustrated in FIGURES 4 and 5.

Figure 4:
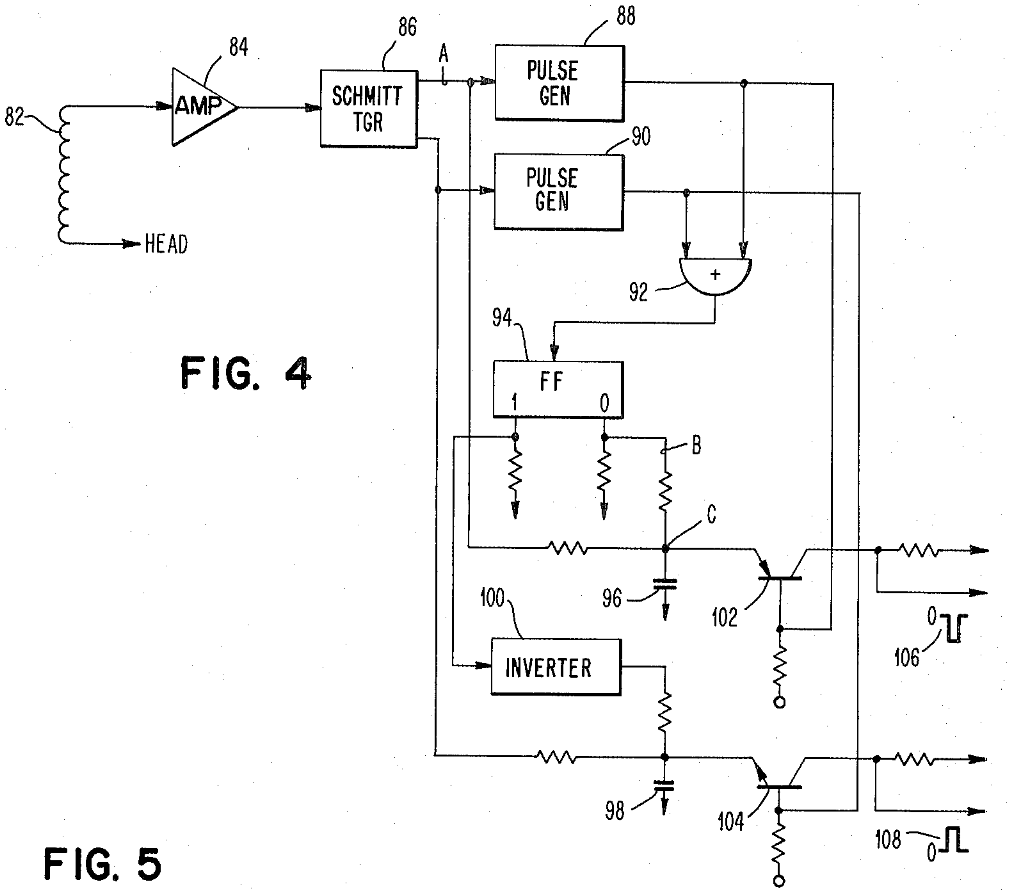
FIGURE 4 is a schematic diagram, partly in block diagram form, illustrating another embodiment of the present invention.
Figure 5:
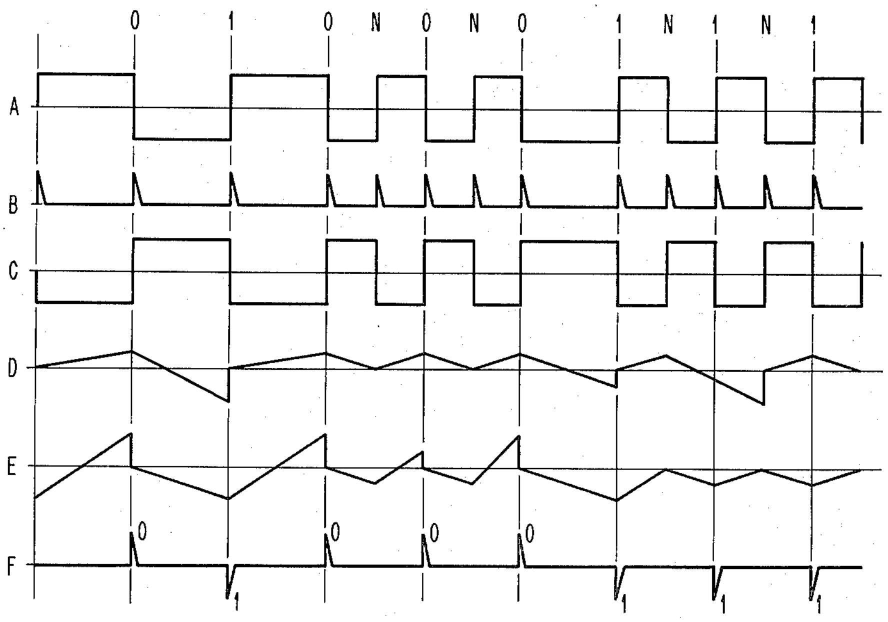
FIGURE 5 illustrates a series of waveforms shown for the purpose of describing the operation of the system illustrated in FIGURE 4.

Referring particularly to FIGURES 4 and 5, information signals may be read from a recording medium by means of a magnetic head 82. The signals read out are suitably amplified by an amplifier 84 and with the amplified signals being applied to a Schmitt trigger circuit 86. The output signal from the Schmitt trigger circuit 86 is illustrated by a waveform A in FIGURE 5. This waveform comprises a substantially rectangular shape signal.

The directions of zero crossover points of the signal represented by waveform A determines the type of information signals. For example, if the direction of the signal at the zero crossover point is downward, the information represented may be considered a "0." If the direction of the signal at the zero crossover point is upward, the information represented may be considered a "1." Information signals may be said to occur at the middle of each digit period. As previously discussed, if two consecutive information signals are of the same characteristic a non-significant zero crossover point will occur at the beginning of the digit period. It is these non-significant zero crossover points which produces the non-significant pulses which must be eliminated in a phase modulation reading system.

The output signal from the Schmitt trigger circuit 86 is applied to a pair of pulse generators 88 and 90. These generators produce pulse signals at all the zero crossover points of the signal from Schmitt trigger circuit 86. The output pulse signals from the pulse generator circuits 88 and 90 are applied to a buffer stage 92, where they are combined. The output pulses from the buffer stage 92 are applied to a flip flop circuit 94 to change the operating state there for each applied pulse. The flip flop circuit 94 may be of the conventional type, the purpose of which being hereinafter described. The combined output pulses from the buffer 92 are illustrated by the waveform B of FIGURE 5.

The output signal from the Schmitt trigger circuit 86 is also applied to a pair of integration circuits comprising capacitors 96 and 98. One side of the flip flop circuit 94, designated the "0" output, is also applied to the capacitor 96. The "1" output of the flip flop 94 is applied to capacitor 98 through an inverter circuit 100. The dates or levels of charge at the capacitors 96 and 98 are dependent upon the source of voltages, namely the Schmitt trigger circuit 86 and the flip flop circuit 94. The output voltage from the flip flop circuit 94 is illustrated by the waveform C. It is noted that the waveform C is out of phase with the signal from the Schmitt trigger circuit, represented by the waveform A.

The rates of charge and discharge of the capacitors 96 and 98 are dependent upon the total voltage applied thereto. The total voltage applied thereto will be the voltage difference between the voltage from the Schmitt trigger circuit 86 and the voltage from the flip flop circuit 94. Since these two voltages are out of phase with respect to each other, it may be seen that the applied voltage during one portion of a signal will be relatively great. Likewise, the total voltage during another portion of a signal may be relatively small. The rate of charge of the capacitors 96 and 98 will be greater for the greater applied voltage and less for the lesser applied voltage.

The rate of charge and discharge of the capacitor 96 is represented by a waveform D of FIGURE 5. The rate of charge and discharge of the capacitor 98 is represented by the waveform E of FIGURE 5.

A pair of transistors 102 and 104 perform substantially the same functions as the transistors 70 and 74 described in connection with FIGURE 2. Output pulse from the pulse generator 88 is applied to the base electrode of the transistor 102. The transistor 102, which may be of the PNP type, is normally non-conducting but becomes conducting when a pulse from the pulse generator 88 is applied to the base of the transistor 102 at the same time that a positive voltage is present at the capacitor 96 and applied to the emitter of the transistor 102. When the transistor 102 becomes conducting, the capacitor 96 is discharged to 0 and an output pulse is produced at the collector of the transistor 102. This output pulse is illustrated by a pulse 106.

In a like manner, the transistor 104, which may be of the NPN type, is normally non-conducting but becomes conducting when a pulse is applied to its base at the same time that a charge is present at the capacitor 98 and applied to the emitter. When both a pulse and a charge is applied to the transistor 104, an output pulse is developed at the collector of the transistor 104. This output pulse is illustrated by a pulse 108.

The output information signal is represented by a waveform F. It is noted that this waveform does not include any non-significant pulses.

It is thus seen that the present invention has employed the technique of integration to eliminate spurious or non-significant pulses from a read out circuit of a phase modulation system. The technique has been employed to detect a state of charge at an integration circuit. The state of charge in case indicated the presence of information. In the second case, the presence of a charge indicated the presence of a non-significant pulse signal.

What is claimed is:

1. A control system comprising a source of signals, a network capable of assuming a positive or negative charge, means for applying said signals to said charging network, an AND gate circuit adapted to pass or inhibit signals therethrough, said AND gate circuit including first and second input means, a control circuit connected to said first input means capable of assuming one of two stable operating states for controlling the operation of said AND gate circuit, means for applying signals from said source of signals to said second input means of said AND gate circuit, a source of sampling signals, means for applying said sampling signals to said network to detect the state of change thereof, means responsive to the state of charge of said network to produce one of two characteristically different control signals when a charge is present at said network, and means for applying said control signals to said control circuit to control the operating states thereof whereby said AND gate is enabled to permit applied signals to pass therethrough.

2. A phase modulation reading system comprising a source of binary information signals having substantially rectangular shaped characteristics, a network capable of assuming a positive or negative voltage charge, means for applying said information signals to said charging network to charge and discharge said network, an AND gate circuit adapted to pass or inhibit signals therethrough, said AND gate circuit including first and second input means, means for applying said information signals to said first input means of said AND gate circuit, a flip flop circuit capable of assuming one of two stable operating states connected to said second input means of said AND gate circuit for controlling the operation of said AND gate circuit, a source of sampling signals derived from said information signals, means for applying said sampling signals to said network to detect the state of change thereof, means responsive to the state of charge of said network to produce one of two characteristically different pulse control signals when a charge is present at said network, and means for applying said pulse control signals to said flip flop circuit to control the operating states thereof whereby said AND gate is either enabled to permit information signals to pass therethrough.

3. A source of information signals representing either a "0" or "1," means for converting said information signals into alternating square wave signals, said "0" and "1" information signals being characterized by the direction of zero crossover of said alternating square wave signals, an integration network means for applying said alternating square wave signals to said integrating network, a pulse generator, means for applying said alternating square wave signals to said pulse generator to produce a series of pulses, said pulses representing information and including non-significant pulses, means for applying said pulses to said integration network to detect the state of charge thereof to produce control signals, a gating circuit, means for applying said pulses to said gating circuit, a flip flop circuit to produce an output signal to control the operation of said gating circuit, said gating circuit permitting said information pulses to pass therethrough when said flip flop is in a first operating state and inhibiting said non-significant pulses from passing therethrough when said flip flop is in a second operating state, and means for applying said control signals from said integration circuit to control the operating state of said flip flop.

4. In a phase modulation reading system, a source of information signals representing either a "0" or a "1," means for converting said information signals into alternating square wave signals, said "0" or "1" information signals being characterized by the direction of zero crossover of said alternating square wave signals, an integration network, means for applying said alternating square wave signals to said integration network, a pulse generator, means for applying said alternating square wave signals to said pulse generator to produce pulses at all the crossover points of said information signals, said pulses representing information and non-significant pulses, means for applying said pulses to said integration network to detect the state of charge thereof to produce control signals whenever a charge is present at said integration network, a gating circuit, means for applying said pulses to said gating circuit, a flip flop circuit to produce an output signal to control the operation of said gating circuit, said gating circuit permitting said information pulses to pass therethrough when said flip flop is in a first operating state and inhibiting said non-significant pulses from passing therethrough when said flip flop is in a second operating state, and means for applying said control signals from said integration circuit to control the operating state of said flip flop.

5. The invention as set forth in claim 4 wherein said integration network assumes a voltage charge whenever two consecutive information signals represent the same type of information and assumes substantially zero voltage charge whenever two consecutive information signals are of different types.

6. The invention as set forth in claim 5 wherein a positive charge at said integration circuit will cause said flip flop circuit to operate in one state and a negative charge at said integration circuit will cause said flip flop to operate in another state, with a zero voltage charge at said integration circuit causing no change in the operating state of said flip flop circuit.

References Cited by the Examiner

UNITED STATES PATENTS

| | | | |
|---|---|---|---|
| 2,587,426 | 2/52 | Aiken | 328—165 X |
| 2,778,933 | 1/57 | Crist | 329—109 |
| 2,834,883 | 5/58 | Lukoff | 328—67 |
| 2,871,378 | 1/59 | Lohman | 307—88.5 |
| 2,918,574 | 12/59 | Gimpel et al. | 328—127 |
| 2,981,853 | 4/61 | Meyer | 307—88.5 |
| 3,054,003 | 9/62 | Pagano et al. | 328—140 |
| 3,072,855 | 1/63 | Chandler | 328—110 |

ARTHUR GAUSS, *Primary Examiner.*